United States Patent

Petree

[15] 3,681,337

[45] Aug. 1, 1972

[54] SUPPRESSION OF TRIS(ALKYLAMINO)-S-TRIAZINE FORMATION IN THE PRODUCTION OF CHLORO-BIS (ALKYLAMINO)-S-TRIAZINES THROUGH THE USE OF ADDITIONAL CYANURIC CHLORIDE

[72] Inventor: Harris E. Petree, Spanish Fort, Ala.

[73] Assignee: Ciba-Geigy Corporation, Greenburgh, N.Y.

[22] Filed: Dec. 31, 1970

[21] Appl. No.: 103,249

[52] U.S. Cl. ........260/249.8, 260/249.5, 260/248 CS
[51] Int. Cl. .............................................C07d 55/20
[58] Field of Search...................................260/249.8

[56] References Cited

UNITED STATES PATENTS 3,590,040  6/1971  Ferguson et al. ..........260/249.8

*Primary Examiner*—John M. Ford
*Attorney*—Karl F. Jorda and Frederick H. Rabin

[57] ABSTRACT

The known commercial method of producing herbicidal chloro-bis(alkylamino)-s-triazines involves the use of cyanuric chloride as a starting material and the step-wise replacement of two chlorine atoms therefrom with alkylamino groups. One of the by-products obtained is a tris(alkylamino)-s-triazine, which is formed by replacement of the third chlorine atom in cyanuric chloride. A method for suppressing the formation of tris(alkylamino)-s-triazines comprises the steps of (1) adding additional cyanuric chloride to the reaction mixture immediately after the chloro-bis(alkylamino)-s-triazine reaction is complete, thus forming a dichloro-alkylamino-s-triazine, (2) hydrolyzing the dichloro-alkylamino-s-triazine and the unreacted cyanuric chloride, and (3) removing of the hydrolyzed by-products by filtration.

7 Claims, 2 Drawing Figures

SUPPRESSION OF TRIS(ALKYLAMINO)-S-TRIAZINE FORMATION IN THE PRODUCTION OF CHLORO-BIS (ALKYLAMINO)-S-TRIAZINES THROUGH THE USE OF ADDITIONAL CYANURIC CHLORIDE

FIELD OF THE INVENTION

The present invention relates to an improved procedure for the preparation of chloro-bis(alkylamino)-s-triazines. In particular, it provides a method for the substantial reduction or elimination of tris(alkylamino)-s-triazines which are formed in small, but often significant, amounts as by-products in the commercial preparation of chloro-bis(alkylamino)-s-triazines.

BACKGROUND OF THE INVENTION

Chloro-bis(alkylamino)s-triazine compounds having the following structure

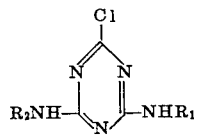

in which $R_1$ and $R_2$ independently represent lower alkyl, inhibit the growth of plants and are widely used as herbicides. The lower alkyl groups denoted by $R_1$ and $R_2$ are specifically those aliphatic and cycloaliphatic radicals of the formula $C_nH_{2n+1}$, where n designates integer of less than 5; thus, they include methyl, ethyl, isopropyl, cyclopropyl, n-butyl, sec-butyl and tert-butyl. Especially valuable as herbicides are atrazine (2-chloro-4-ethyl-amino-6-isopropylamino-s-triazine), simazine (2-chloro-4,6-bis(ethylamino)-s-triazine), and propazine (2-chloro-4,6-bis(isopropylamino)-s-triazine). These compounds are employed both as selective herbicides for weed control among cultivated plants and as soil sterilents for the total elimination of undesired plant growth. Further details with respect to these and other chloro-bis(alkylamino)-s-triazines are set forth in U.S. Pat. No. 2,891,855.

These chloro-bis(alkylamino)-s-triazines are normally prepared from cyanuric chloride by stepwise substitution of two chlorine atoms by alkylamino groups. The first reaction proceeds according to the general scheme:

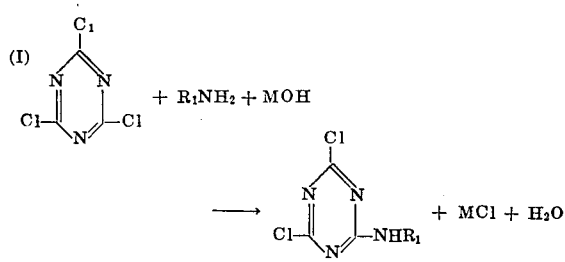

where M represents an alkali metal. The second reaction proceeds according to the scheme:

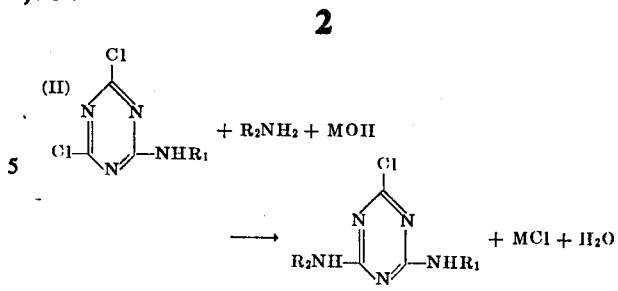

In the commercial preparation of atrazine, for example, cyanuric chloride is first reacted with isopropylamine and an alkali metal hydroxide, such as aqueous sodium hydroxide, to yield 2,4-dichloro-6-isopropylamino-s-triazine according to the following reaction:

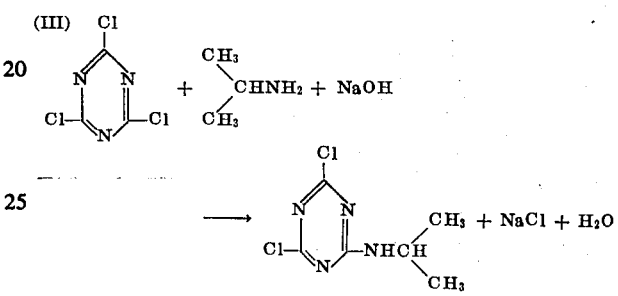

In this reaction substantially equimolar amounts of cyanuric chloride and isopropylamine are used, and the temperature is controlled within the range of from about 5° to 20° C by means of refrigeration or the addition of ice. The 2,4-dichloro-6-isopropylamino-s-triazine intermediate is then reacted with ethylamine and additional sodium hydroxide to obtain the product, 2-chloro-4-ethylamino-6-isopropylamino-s-triazine, according to the following reaction scheme:

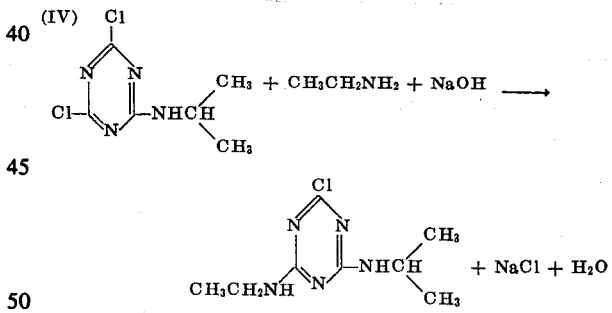

The temperature of this reaction is controlled in the range of about 40° to 65° C, preferably between 50° C and 60° C. In this second reaction, a 15 percent excess of sodium hydroxide and a 1 to 5 percent excess of ethylamine, over their equimolar amounts, are used. The excess sodium hydroxide is for the purpose of maintaining a strongly alkaline medium, i.e., a pH at a level of from about 10.5 to about 12.5, preferably about 11.5 to 12. The excess ethylamine is used to insure that all of the 2,4-dichloro-6-isopropylamino-s-triazine is reacted. This dichloro compound is irritating to the skin; atrazine which is contaminated with more than 0.5 percent of this dichloro compound is not acceptable. The excess amount of ethylamine, plus the fact that reaction (IV) proceeds at a rapid rate, insures that none of this dichloro compound contaminates the final product.

In commercial practice, chloro-bis(alkylamino)-s-triazines such as 2-chloro-4-ethylamino-6-isopropylamino-s-triazine, are prepared according to two broad general methods. The first is a batch process in which both of the foregoing reactions take place in a single vessel; i.e., the cyanuric chloride is first converted to the dichloro-alkylamino-s-triazine intermediate and, after this reaction is complete, the intermediate is then converted to the chloro-bis(alkylamino) product. The second method is a continuous process in which the first reaction proceeds in one vessel and the intermediate product is transferred to a second vessel for the second reaction. Reaction conditions, such as temperature, pressure, and pH control, and the solvents used vary widely according to which method of preparation is being used. However, the basic chemical reactions and products remain the same.

In the second reaction, i.e., the conversion of the dichloro-alkylamino-s-triazine to the chloro-bis (alkylamino)-s-triazine, one of the by-products is a tris (alkylamino)-s-triazine, which forms from the reaction of the chloro-bis(alkylamino)-s-triazine product with an additional molecule of the alkylamine. Thus, in the preparation of atrazine, illustrated above, small amounts of 2,4-bis(ethylamino)-6-isopropylamino-s-triazine are formed by the replacement of the chlorine atom in the desired product by an additional ethylamino group. 2,4-bis(Ethylamino)-6-isopropylamino-s-triazine is a waxy substance and, even in relatively small amounts, interferes seriously with the filtration of the desired product. Furthermore, this by-product impairs the stability and flowability of flowable atrazine formulations.

The tris(alkylamino)-s-triazine by-product can be formed in two ways. First, it may be formed in small amounts during the second reaction in competition with additional 2-chloro-bis(alkylamino)-s-triazine product; some of the ethylamine will react with the already formed product rather than reacting with the dichloro-alkylamino-s-triazine. Fortunately, the conversion of chloro-bis (alkylamino)-s-triazines to tris(alkylamino)-s-triazines proceeds at a considerably slower rate than the conversion of dichloro-alkylamino-s-triazines to chloro-bis(alkylamino)-s-triazines. Thus, by proper and careful limitation of reaction times, temperature and pressure — and by having only a very slight molar excess of alkylamine, e.g., no more than about 0.1 percent excess — it is possible to obtain a final product in which the tris(alkylamino)-s-triazine content is acceptable. In actual commercial practice, however, it is not always feasible to control the reaction conditions and the amount of alkylamine excess to the close degree necessary to attain acceptable levels of tris(alkylamino)-s-triazine formation. Thus, in order to insure that all of the dichloro-alkylamino-s-triazine is reacted, one must, in practice, use at least a 1 percent, and preferably a 2 to 5 percent, molar excess of alkylamine. In commercial practice, an excess of about 3 percent is used. The second and more significant way in which the tris (alkylamino)-s-triazine by-product is formed occurs after all of the dichloro-alkylamino-s-triazine has been converted to the chloro-bis(alkylamino)-s-triazine product. The excess alkylamine reacts with the product to form the tris(alkylamino) by-product.

In the preparation of atrazine, after the replacement of the second chlorine atom with the ethylamino group is complete, one obtains a slurry containing, inter alia, the desired product, unreacted ethylamine, the organic solvent for the cyanuric chloride starting material, sodium hydroxide, and small amounts of 2,4-bis(ethylamino)-6-isopropylamino-s-triazine as a by-product. In practice, this slurry is transferred to a holding tank from which the solvent is removed by distillation. The desired product is then recovered by filtration. In the slurry tank and in subsequent high-temperature distillation, the 2-chloro-4-ethylamino-6-isopropylamino-s-triazine product and the unreacted ethylamine react to form additional tris(alkylamino) by-product, the amount formed being a function of the contact time, pH and amine excess. If this additional contact time at strongly alkaline pH could be eliminated, the amount of tris(alkylamino) by-product formed would probably be at acceptably low levels. However, because in actual practice, the stripping and filtration process requires a length of time in excess of 30 minutes, it would be desirable to remove the unreacted ethylamine either in the slurry holding tank or prior to the transfer of the slurry into said holding tank.

Accordingly, it is an object of this invention to provide in a process for the manufacture of chlorobis(alkylamino)-s-triazines, a method for rapid deactivation of unreacted alkylamine, thus averting the formation of tris(alkylamino)-s-triazines. It is a further object of this invention to provide a process for preparing chlorobis(alkylamino)-s-triazines which are substantially free of contamination by tris(alkylamino)-s-triazines.

SUMMARY OF THE INVENTION

In the present invention, cyanuric chloride, in an amount in excess of the excess alkylamine is added to the product slurry. Additional alkali metal hydroxide is also added to the product slurry in order to maintain the pH at its strongly alkaline level. The cyanuric chloride reacts with the ethylamine to form 2,4-dichloro-6-(alkylamino)-s-triazine. This dichloro compound, together with the unreacted cyanuric chloride, is then hydrolyzed by the alkali metal hydroxide and solubilized in the water phase of the slurry. These hydrolyzed products are subsequently removed during the filtration step.

DETAILED DESCRIPTION OF THE INVENTION

Figure 1:
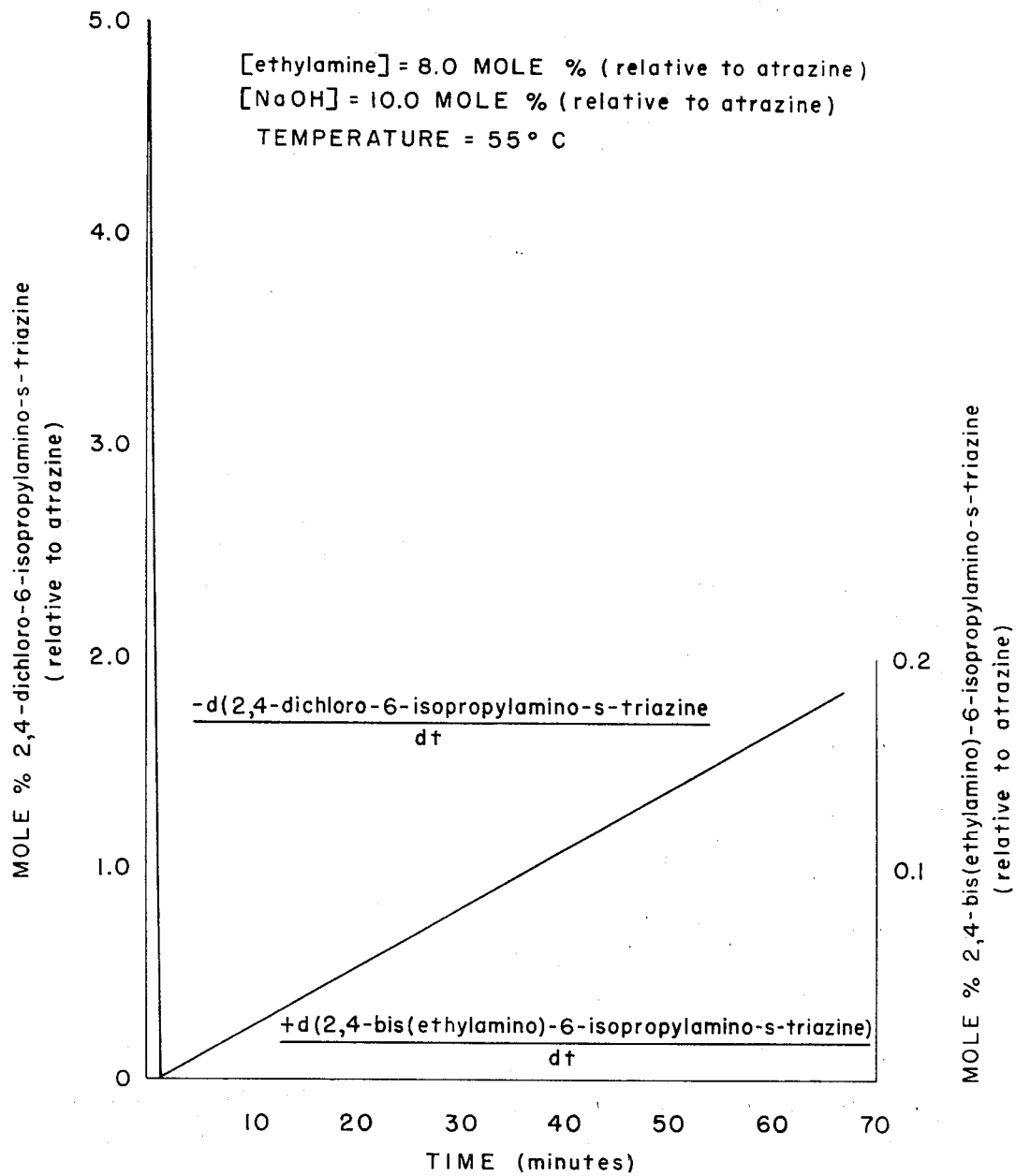

The presence of small amounts of tris (alkylamino)-s-triazines in the final 2-chloro-4,6-bis(alkylamino)-s-triazine products has not heretofore been a serious problem. However, there have recently been developed new solid and flowable formulations of these herbicidal triazines which are characterized by greatly increased ease of handling and application and by improved herbicidal effectiveness. The presence of tris(alkylamino)-s-triazine impurities in these new formulations at levels above about 0.1 percent of the total triazine product causes some difficulties in storage and handling. Accordingly, it is necessary — in order to take advantage of the improvements available by use of these new formulations — to produce 2-chloro-4,6-bis(alkylamino)-s-triazine herbicides which contain no more than about 0.1 percent of tris(alkylamino)-s-triazines. The tris(alkylamino)-s-triazine concentration should be below 0.1 percent and preferably below 0.05 percent based on the weight of total triazines present.

By proper control of the reaction time and conditions during reaction (II) described above, one can obtain a 2-chloro-4,6-bis(alkylamino)-s-triazine product slurry in which the level of tris(alkylamino)-s-triazine impurity is below 0.05 percent and in some cases even non-detectable (i.e., less than 0.01 percent). This product slurry, containing, inter alia, the 2-chloro-4,6-bis(alkylamino)-s-triazine product and the un-reacted alkylamine (present because of the 1 to 5 percent excess used), is transferred first to a holding tank, then to a solvent stripping column, and then to a filter on which the final product is separated. While the slurry is in the holding tank, the slow reaction between the desired and the unreacted alkylamine takes place, resulting in the formation of additional tris(alkylamino)-s-triazine. If the slurry holding tank could be eliminated, i.e., if the reaction slurry could proceed from the reactor directly to the filtering and stripping media, the problem of additional tris(alkylamino)-s-triazine formation would be obviated. However, in commercial practice, particularly with batch reactors, this is not feasible. It is therefore necessary to remove or otherwise deactivate (i.e., quench) the unreacted alkylamine as soon as possible after reaction (II) is complete.

This is accomplished by adding to the product slurry, shortly after completion of reaction (II), sufficient cyanuric chloride to react with the excess alkylamine. By this reaction, a 2,4-dichloro-6-(alkylamino)-s-triazine is formed in a manner analogous to reaction (I). In practice, an excess of cyanuric chloride (relative to the amount of alkylamine excess) is added to insure that all of the unreacted alkylamine is removed. A molar excess from about 1 % to 100% or more may be used, but it is convenient to use a molar excess of from 50 to about 100 percent. Concurrently with the addition of cyanuric chloride (or shortly thereafter) sufficient alkali metal hydroxide is added in order to (1) maintain the pH in the strongly alkaline range, i.e., from about 10.5 to 12.5, preferably from 11.5 to 12, and to (2) hydrolyze the 2,4-dichloro-6-(alkylamino)-s-triazine and the unreacted cyanuric chloride to their water-soluble sodium salts. The amount of alkali metal hydroxide added can be conveniently calculated on the basis of the amount required in reaction (II). If a 100 percent molar excess of cyanuric chloride [relative to the excess alkylamine used in reaction (II)] is employed, an excess of alkali metal hydroxide in the range of from about 10 to about 50 percent, preferably from about 15 to about 30 percent will ensure sufficient alkali metal hydroxide for reasonably rapid hydrolysis. Thus, the excess alkylamine is no longer available to react with the 2-chloro-4,6-bis(alkylamino)-s-triazine product. Furthermore, the undesirable 2,4-dichloro-6-(alkylamino)-s-triazine condensation product, which results from the elimination of the excess alkylamine, is also removed.

In the preparation of atrazine, where the unreacted alkylamine is ethylamine and sodium hydroxide is used in reaction (II) to maintain the strongly alkaline medium, the reaction with cyanuric chloride proceeds as follows:

(V)

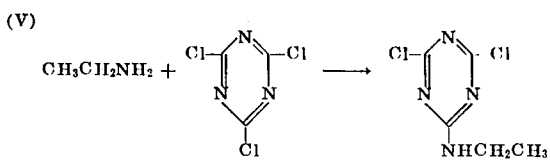

The 2,4-dichloro-6-(ethylamino)-s-triazine formed is hydrolyzed according to the following reaction:

(VI)

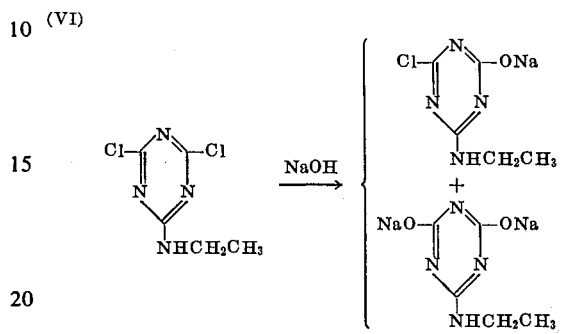

In addition, the unreacted excess cyanuric chloride is also hydrolyzed according to the reaction:

(VII)

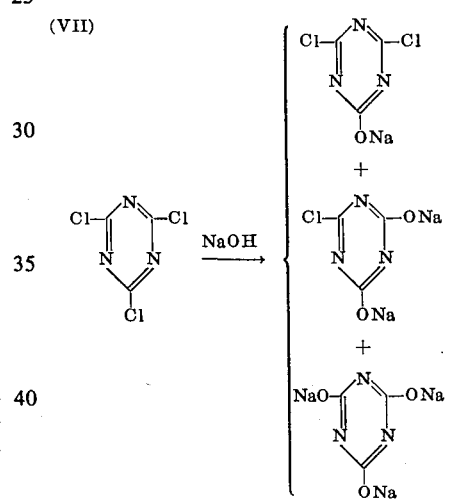

These reactions vary according to temperature and the amount of alkali metal hydroxide present. It has been found that post-reaction time can be accelerated by the use of excess alkali metal hydroxide. Therefore, it is suggested that sodium hydroxide be used in molar excess of from about 10 to about 50 percent, based on the amount needed by the stoichiometry of reaction (II). For example, in the preparation of atrazine, it has been found that use of a 25 percent excess sodium hydroxide and maintenance of the post-reaction temperature of 70° C requires a post-reaction time of about one hour for substantially all of the 2,4-dichloro-6-(ethylamino)-s-triazine and unreacted cyanuric chloride to be hydrolyzed. In addition, hydrolysis time can be lowered by increasing pressure or by refluxing. It is important that hydrolysis be complete since the upper permissible limit of 2,4-dichloro-6-(ethylamino)-s-triazine impurity in atrazine is 0.5 mole %.

After the hydrolysis is complete, the organic solvent (for the cyanuric chloride starting material) is then removed in the usual manner, by distillation. And, lastly, the insoluble 2-chloro-4,6-bis(alkylamino)-s-triazine product is removed from the remaining aqueous slurry (now containing hydrolyzed 2,4-dichloro-6-(alkylamino)-s-triazine and hydrolyzed cyanuric chloride) by filtration and subsequent washing in the usual manner.

The following examples are intended to illustrate some of the theory and embodiments of the present invention. The examples therefore are for illustrative purposes only and are not to be construed as limitations.

EXAMPLE 1

This example illustrates the rates of formation of atrazine (2-chloro-4-ethylamino-6-isopropylamino-s-triazine) and the 2,4-bis(ethylamino)-6-isopropylamino-s-triazine by-product during the reaction of 2,4-dichloro-6-isopropylamino-s-triazine with ethylamine (reaction (IV) described above). To a 250 ml Erlenmeyer flask, thermostated by water bath at 55° C and equipped with a magnetic stirrer, was charged 102 g. of water, 19.2 g. of sodium chloride, 75.2 g. of methylethylketone, 1.70 g. of 2,4-dichloro-6-isopropylamino-s-triazine (5 percent molar excess relative to a normal atrazine change), 8.9 g. of atrazine, 0.84 g. of ethylamine (8 percent molar excess relative to a normal atrazine change) and 1.33 g. of sodium hydroxide (10 percent excess). The contents of the flask are representative of the contents of the reactor during the second stage of the commercial preparation of atrazine. The amount of atrazine was reduced considerably in order to facilitate sampling and analysis. However, there was a considerable amount of atrazine present in the water/methylethylketone slurry. The disappearance of the 2,4-dichloro-6-isopropylamino-s-triazine and the appearance of the trisamino impurity, 2,4-bis(ethylamino)-6-isopropylamino-s-triazine, were followed by gas chromatographic analysis of the methylethylketone layer. The accompanying FIG. 1 is the plot of the disappearance of the 2,4-dichloro intermediate and the subsequent appearance of the tris (alkylamino) by-product as a function of time. The data indicate that the replacement of the 4-chlorine atom in 2,4-dichloro-6-isopropylamino-s-triazine with an ethylamino group, thus producing atrazine, is substantially complete in less than 2 minutes. The reaction of atrazine with the excess ethylamine and the subsequent formation of 2,4-bis(ethylamino)-6-isopropylamino-s-triazine proceeds at a considerably slower rate. Thus, if the excess ethylamine could be physically removed within, say, about 30 minutes after the atrazine reaction is complete, the amount of 2,4-bis(ethylamino)-6-isopropylamino-s-triazine formed would be below about 0.1 mole percent and thus would be acceptable for most purposes, particularly for formulation purposes. However, since physical removal of the excess ethylamine within this time period is not always feasible, it would be desirable to develop a method of quenching, i.e., deactivating, the ethylamine so as to prevent formation of this tris(alkylamino) by-product.

EXAMPLE 2

The use of additional cyanuric chloride to quench excess alkylamine was evaluated in the production of atrazine. The product was produced under laboratory conditions by the usual commercial method of stepwise replacement of two chlorine atoms in cyanuric chloride with isopropylamino and ethylamino groups, respectively. In the second reaction, excess ethylamine in amounts of 2.0 and 5.0 percent (relative to atrazine) were used; there was also a run in which only the stoichiometric amount (no excess) of ethylamine was used. The solvent employed was methylethylketone and the reaction temperature was kept at 50° by means of the addition of ice. In the runs with with excess ethylamine, a 100 percent excess of cyanuric chloride (relative to the amine excess) was added immediately after the second reaction was complete. In addition, sufficient sodium hydroxide was added in order to maintain the pH of the slurry at about 11.5. After allowing a post-reaction time of two or three hours in order to ensure complete hydrolysis of the 2,4-dichloro-6-(ethylamino)-s-triazine condensation product, the methylethylketone solvent was stripped, and the atrazine product recovered in the usual manner. The amount of 2,4-dichloro-6-(ethylamino)-s-triazine (reported as "dichloro"), 2,4-bis(ethylamino)-6-isopropylamino-s-triazine (reported as "tris"), and the hydroxytriazines (reported as "-hydroxy") were noted. The results are set forth in Table I, "ND" standing for "non-detectable."

TABLE I

| Run | Mole percent excess EtNH₂ (relative to atrazine) | Mole percent cyanuric chloride (relative to atrazine) | Reaction time, hours | Percent EtNH₂ in solvent ND <.001% | Percent tris in filtrate | Dry cake, percent | | |
|---|---|---|---|---|---|---|---|---|
| | | | | | | Dichloro ND <.01% | Tris ND <.05% | Hydroxy |
| 1 | 0 | 10.0 | 3 | ND | 0.01 | ND | ND | 0.03 |
| 2 | 5 | 10.0 | 3 | Trace | 0.01 | ND | ND | 0.03 |
| 3 | 2 | 4.0 | 2 | 0.001 | 0.01 | ND | ND | 0.03 |

These data indicate that the additional cyanuric chloride effectively quenches the excess ethylamine used in the second reaction. The amount of tris found in the final atrazine dry cake in all runs is below the level of detectability (0.05 percent). Thus, the "tris" level in runs with excess ethylamine is, for all practical purposes, no higher than the level of "tris" obtained in Run 1, a run in which no excess ethylamine was used. Furthermore, Run 1 shows that substantially all the excess cyanuric chloride is eliminated even where there is no excess amine present.

EXAMPLE 3

Figure 2:
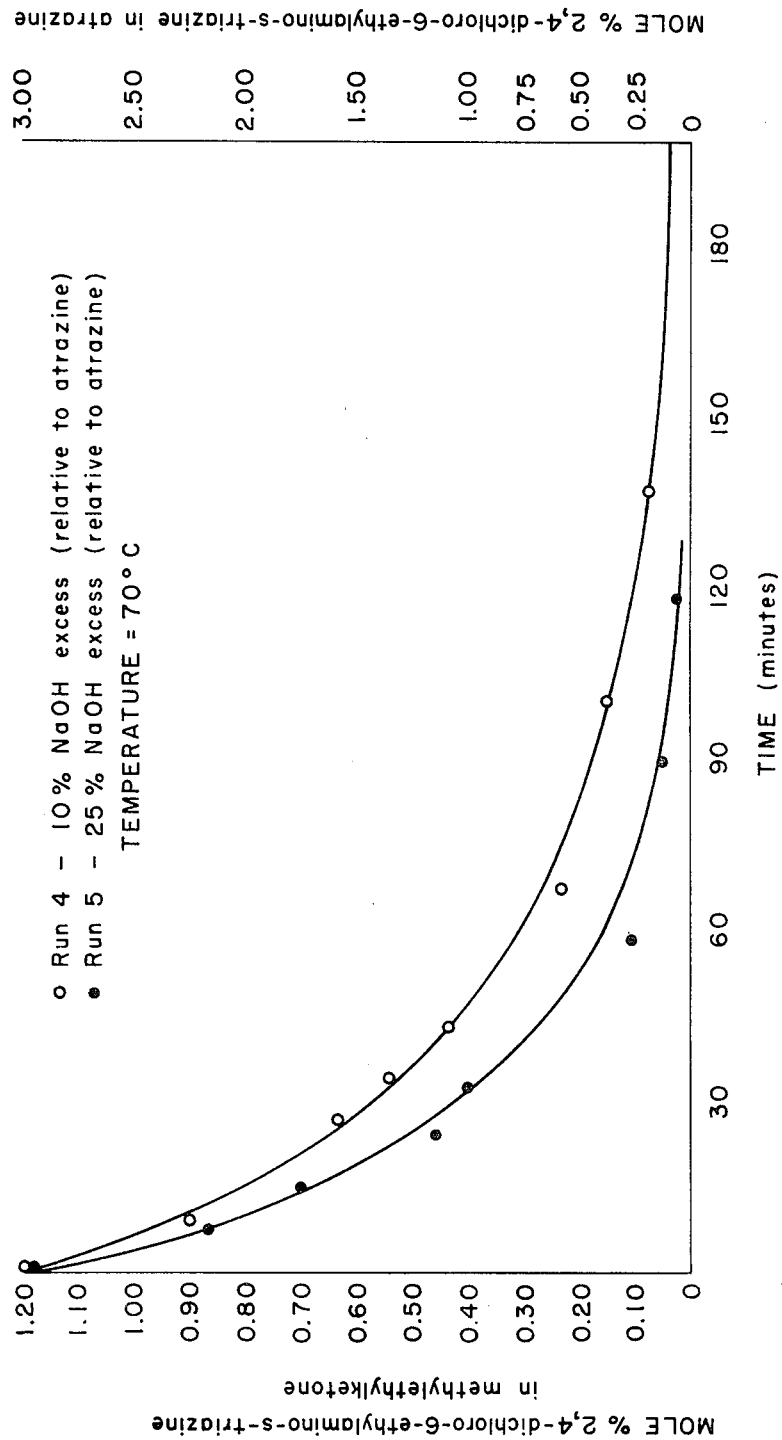

To ascertain the time requirements for the 2,4-dichloro-6-(ethylamino)-s-triazine condensation product to be entirely hydrolyzed, kinetic studies were made in connection with the atrazine preparation described in Example 2. A 3 percent molar excess of ethylamine was present in the second reaction and, immediately after this reaction terminated, a 100 percent molar excess of cyanuric chloride (relative to the amine excess) was added. The temperature was raised to 70° C and sufficient sodium hydroxide was added in order to provide excesses of 10 percent and 25 percent. The post-reaction time was planned for three hours and the amount of 2,4-dichloro-6-(ethylamino)-s-triazine was measured at various times during this period. FIG. 2 in the drawings is a plot of the "dichloro" content as a function of time. With a 10 percent excess of sodium hydroxide, approximately 80 minutes is required for the "dichloro" level to decrease to the permissible upper limit of 0.5 mole percent relative to atrazine. At a sodium hydroxide excess level of 25 percent, however, the hydrolysis reaction proceeds considerably faster. Only 50 minutes are required to reach the 0.5 percent "dichloro" level. Thus, the rate of hydrolysis of the "dichloro" is also a function of the amount of sodium hydroxide excess. In order to ensure that the amount of 2,4-dichloro-6-(ethylamino)-s-triazine does not exceed the 0.5 mole percent level (relative to atrazine), care must be taken to allow sufficient time for the hydrolysis to be complete.

EXAMPLE 4

The process of this invention is also applicable to triazine herbicides other than atrazine, which are produced by the step-wise replacement of two chlorine atoms in cyanuric chloride by alkylamino groups. Examples of these other triazine herbicides and their method of manufacture are listed in Table II, which indicates the order of replacement of the two chlorine atoms in cyanuric chloride according to reactions (I) and (II) described above. In all cases, reaction (II) employs alkylamine in an excess of about 3 percent.

TABLE II

| Triazine herbicide | First alkylamine (Reaction I) | Second alkylamine (Reaction II) |
|---|---|---|
| 2-chloro-4,6-bis(isopropylamino)-s-triazine (propazine) | isopropylamine | isopropylamine |
| 2-chloro-4,6-bis(ethylamino)-s-triazine (simazine) | ethylamine | ethylamine |
| 2-chloro-4-sec-butylamino-6-ethylamino-s-triazine | sec-butylamine | ethylamine |
| 2-chloro-4-tert-butylamino-6-ethylamino-s-triazine | tert-butylamine | ethylamine |

After reaction (II) is complete, an 80 percent molar excess of cyanuric chloride (relative to the excess ethylamine or isopropylamine present) is added to the product slurry. Immediately thereafter, sodium hydroxide is added for the purpose of hydrolyzing the 2,4-dichloro-6-ethylamino-s-triazine or 2,4-dichloro-6-isopropylamino-s-triazine and any unreacted cyanuric chloride. A molar excess of 25 percent hydroxide is used and the temperature is raised to about 70° C in order to hasten the hydrolysis. After about an hour, the hydrolysis is complete, and organic solvent (for the cyanuric chloride) is removed by distillation and the triazine herbicide product is recovered by filtration.

I claim:

1. In a process for preparing chloro-bis (alkylamino)-s-triazines in a strongly alkaline medium by means of the step-wise replacement of two chlorine atoms of cyanuric chloride with alkylamino groups and in which the second alkylamine is present in a molar excess of at least 1 percent, the method of suppressing the formation of tris(alkylamino)-s-triazines which comprises adding to the reaction mixture, after the second chlorine atom has been replaced with an alkylamino group, (1) cyanuric chloride in an amount sufficient to react with the excess alkylamine thus forming a dichloro-alkylamino-s-triazine and (2) sufficient alkali metal hydroxide in order to maintain the pH of the reaction mixture at between about 11.5 and 12.5 and to hydrolyze the dichloro-alkylamino-s-triazine.

2. The method of claim 1 in which the cyanuric chloride is added in a molar excess of from about 50 to 100 percent relative to the excess of alkylamine present.

3. In a process for preparing 2-chloro-4-ethylamino-6-isopropylamino-s-triazine in a medium having a pH of from about 11.0 to 12.5 by means of the step-wise replacement of two chlorine atoms of cyanuric chloride with an isopropylamino group and an ethylamino group and in which the ethylamine is present in a molar excess of from about 1 to about 5 percent, the method of suppressing the formation of 2,4-bis (ethylamino)-6-isopropylamino-s-triazine which comprises adding to the reaction mixture, after the second chlorine atom has been replaced with an ethylamino group, (1) cyanuric chloride in an amount sufficient to react with the excess ethylamine in order to form 2,4-dichloro-6-(ethylamino)-s-triazine and (2) sufficient alkali metal hydroxide in order to maintain the pH in a range of between about 11.5 and 12.5 and to hydrolyze the 2,4-dichloro-6-(ethylamino)-s-triazine.

4. The method of claim 3 in which the cyanuric chloride is added in a molar excess of from 50 to 100 percent relative to the excess ethylamine present.

5. The method of claim 3 in which the alkali metal hydroxide is sodium hydroxide.

6. The method of claim 5 in which the reaction mixture is allowed to remain for a period of 3 hours at a temperature of 50° after the addition of the cyanuric chloride and sodium hydroxide in order to ensure that hydrolysis is complete.

7. The method of claim 5 in which the reaction mixture is allowed to remain at a temperature of 70° C for a period of one hour after the addition of the cyanuric chloride and sodium hydroxide in order to ensure that the hydrolysis is complete.

* * * * *